United States Patent
Höcker et al.

(10) Patent No.: US 12,235,145 B2
(45) Date of Patent: Feb. 25, 2025

(54) ASSEMBLY COMPRISING A PRESSURE TAPPING LINE WITH A PRESSURE MEASURING DEVICE, AS WELL AS A FLOW MEASURING POINT COMPRISING AN ASSEMBLY OF THIS TYPE

(71) Applicant: Endress+Hauser Flowtec AG, Reinach (CH)

(72) Inventors: Rainer Höcker, Waldshut (DE); Daniel Kessler, Frenkendorf (CH)

(73) Assignee: Endress+Hauser Flowtec AG, Reinach (CH)

( * ) Notice: Subject to any disclaimer, the term of this patent is extended or adjusted under 35 U.S.C. 154(b) by 175 days.

(21) Appl. No.: 17/286,541

(22) PCT Filed: Sep. 5, 2019

(86) PCT No.: PCT/EP2019/073740
§ 371 (c)(1),
(2) Date: Apr. 19, 2021

(87) PCT Pub. No.: WO2020/078617
PCT Pub. Date: Apr. 23, 2020

(65) Prior Publication Data
US 2021/0381872 A1 Dec. 9, 2021

(30) Foreign Application Priority Data
Oct. 17, 2018 (DE) ...................... 10 2018 125 776.7

(51) Int. Cl.
*G01F 15/08* (2006.01)
*F22B 37/38* (2006.01)

(52) U.S. Cl.
CPC .............. *G01F 15/08* (2013.01); *F22B 37/38* (2013.01)

(58) Field of Classification Search
CPC ...................................................... G01F 15/08
(Continued)

(56) References Cited

U.S. PATENT DOCUMENTS

2012/0174650 A1* 7/2012 Ariessohn ................. B03C 3/41
73/23.2

FOREIGN PATENT DOCUMENTS

| CN | 201241692 Y | 5/2009 |
| CN | 103728091 A | 4/2014 |

(Continued)

OTHER PUBLICATIONS

Email, re: LiquiPipe Water Technologies.

*Primary Examiner* — Alexander A Mercado
*Assistant Examiner* — Rodney T Frank
(74) *Attorney, Agent, or Firm* — Kelly J. Smith; Endress+Hauser (USA) Holding, Inc.

(57) ABSTRACT

The present disclosure relates to an assembly comprising a pressure tapping line having a first end and a second end. A pressure measuring device registers a pressure within the pressure tapping line and the pressure tapping line is adapted to be connected using the first end to a vapor conveying pipe or tube. The pressure measuring device is adapted to be connected to the second end of the pressure tapping line and the pressure tapping line has a sectionally bent trap adapted to contain a condensate of the vapor. The assembly is adapted to be applied outside and includes a wind protector to lessen atmospherically related air movements at least in the region of the trap.

15 Claims, 7 Drawing Sheets

(58) Field of Classification Search
USPC .......................................................... 73/200
See application file for complete search history.

(56) References Cited

FOREIGN PATENT DOCUMENTS

| | | |
|---|---|---|
| DE | 8804105 U1 | 7/1989 |
| DE | 4421273 A1 | 1/1996 |
| DE | 29522322 U1 | 12/2001 |
| DE | 10156495 C1 | 1/2003 |
| EP | 0334235 A1 | 9/1989 |
| JP | 2000186969 A | 7/2000 |
| RU | 2554955 C1 | 7/2015 |

* cited by examiner

ASSEMBLY COMPRISING A PRESSURE TAPPING LINE WITH A PRESSURE MEASURING DEVICE, AS WELL AS A FLOW MEASURING POINT COMPRISING AN ASSEMBLY OF THIS TYPE

CROSS-REFERENCE TO RELATED APPLICATIONS

The present application is related to and claims the priority benefit of German Patent Application No. 10 2018 125 776.7, filed on Oct. 17, 2018 and International Patent Application No. PCT/EP2019/073740, filed on Sep. 5, 2019, the entire contents of which are incorporated herein by reference.

TECHNICAL FIELD

The invention relates to an assembly comprising a pressure tapping line with a pressure measuring device as well as to a flow measuring point comprising an assembly of this type.

BACKGROUND

Pressure tapping lines are applied, for example, in power plants, in order to be able to measure a media pressure in a vapor conveying pipeline; see, for example, DE29522322U1. Such pressure tapping lines usually have a trap, in which condensate of the vapor forming medium is collected. The condensate protects a pressure measuring device connected to the pressure tapping line against pressure surges and high temperatures, in order that the pressure measuring device not be damaged during operation.

Depending on location of use, such a pressure tapping line can also be arranged outside and thus be exposed to wind and weather. Such can especially in the winter at freezing temperatures and in the presence of wind lead to freezing of the condensate in the trap, so that a pressure measurement is no longer possible. In given cases, also the pressure tapping line can be damaged by such freezing. In order to avoid this freezing, it has been the practice in the winter to mount a heating apparatus or insulation in the region of the trap. Such is, however, cumbersome, and the heating apparatus or insulation must be removed in the summer, in order that the medium can still condense in the trap. A heating apparatus also continuously consumes electrical power.

SUMMARY

An object of the invention is, consequently, to provide a weather independently functioning assembly as well as a flow measuring point with an assembly of this type.

The object is achieved by an assembly as defined in independent claim 1 as well as by a flow measuring point as defined in independent claim 14.

An assembly of the invention comprises:
a pressure tapping line having a first end and a second end,
a pressure measuring device for registering a pressure within the pressure tapping line,
wherein the pressure tapping line is adapted to be connected to a vapor conveying pipe or tube by means of the first end, wherein the pressure measuring device is adapted to be connected to the second end of the pressure tapping line,
wherein the pressure tapping line has a sectionally bent trap, which is adapted to contain a condensate of the vapor, wherein the assembly is adapted to be applied outside,
wherein the assembly includes a wind protector, which is adapted to lessen atmospherically related air movements at least in the region of the trap.

The lessening of atmospherically related air movements minimizes the risk of freezing. Since some local convection as a result of temperature differences between pressure tapping line and surrounding air is still possible, also in the summer at high temperatures an inevitable temperature equilibration between pressure tapping line and surrounding air can take place. This assures a low maintenance operation of the assembly in all kinds of weather.

In an embodiment, the wind protector includes a tubular wall having a first open end as well as a second open end, wherein an envelope of the wind protector encloses an internal volume, in which the trap is arranged, wherein a cross section of the tubular wall traces, for example, a circle, an oval, or a rectangle.

The cross sectional geometry can be adapted, or correspondingly selected, by those skilled in the art for local conditions, conditions such as, for example, a pressure tapping line geometry.

In an embodiment, the internal volume of the wind protector equals a third power of an outer radius of a trap bend multiplied by a factor of F, wherein F is less than 1000, and, especially, less than 200 and preferably less than 100.

The wind protector must be large enough to permit a sufficient convection, and small enough also to offer low wind resistance in the case of stormy weather.

In an embodiment, the pressure tapping line includes a first section toward the first end and a second section toward the second end, wherein the wall of the wind protector has at least one slot, by means of which the wind protector can be mounted on the pressure tapping line, wherein the pressure tapping line extends through the slot.

The pressure tapping line can, thus, at least partially provide a hold for the wind protector.

In an embodiment, the trap bend includes an inner side and an outer side, wherein the wind protector has a holder apparatus, which is adapted to lie against the inner side of the trap. Thus, the weight of the wind protector is supported by the pressure tapping line.

In an embodiment, the holder apparatus comprises a strut, which is mounted to the wall by means of two openings in the wall.

Such a strut can be formed, for example, by a screw with a nut. For example, such an embodiment is then mounted to the wall.

In an embodiment, at least one slot includes a bearing surface. In such case, a hold against the force of gravity is provided at least partially by the bearing surface.

In an embodiment, at least one seating of the wind protector on the pressure tapping line has thermal insulation, wherein the thermal insulation has a thermal conductivity, which is less at least by a factor of 5 and, especially, at least by a factor of 25, and preferably at least by a factor of 100 than a thermal conductivity of the pressure tapping line.

Such a thermal insulation can be mounted, for example, on the tubular wall or on the holder. Alternatively, also the pressure tapping line can have a thermal insulation in the region of a seating, which thermal insulation is embodied, for example, cuff shaped.

In an embodiment, the wall is made of sheet material, wherein the sheet material comprises, for example, aluminum, steel or a plastic.

In an embodiment, the wind protector comprises at least one lid element, which is adapted partially to close the first open end or the second open end of the tubular wall.

A lid element, which partially closes the first open end or the second open end, lessens the possibility of wind penetrating into the internal volume. The only partial closure, however, retains the convection practically unhindered.

In an embodiment, the lid element includes an aerodynamically acting feature, which is adapted to lead atmospherically related air movements past and not into an opening of the lid. In this way, wind can be led past and not into the first open end and/or the second open end.

Alternatively to a lid element, the wall in the region of the first open end or of the second open end can, in each case, have at least one folding, or angling, wherein the folding/angling partially closes the first open end, or the second open end, as the case may be. The first, or second open end is, in such case, defined by the constricted tubular region of the wall.

In an embodiment, the trap is spaced from the wall. Thus, a temperature equilibration between wind protector and trap is minimized, in order to prevent a freezing of the trap in the winter.

In an embodiment, the pressure tapping line includes on its second end a valve, which is adapted to enable a safe connecting of the pressure measuring device, wherein the valve has especially an actuating element with a longitudinal axis, such as, for example, an actuating element in the form of a turning handle, which longitudinal axis extends with an angle of less than 60 degree, and, especially, less than 45 degree, and preferably less than 30 degree from a radius of the pressure tapping line.

A flow measuring point of the invention for measuring a volume flow or a flow velocity or a mass flow of a vaporous medium in a pipeline comprises:

a flow measuring device having a measuring tube, wherein the measuring tube is connected with the pipeline, an assembly as described above, wherein the pressure tapping line is connected to the the measuring tube of the flow measuring device.

In an embodiment, the flow measuring device is a vortex, flow measuring device, an ultrasonic, flow measuring device, a thermal, flow measuring device or a pressure difference, flow measuring device.

BRIEF DESCRIPTION OF THE DRAWINGS

The invention will now be described based on examples of embodiments presented in the appended drawing, the figures of which show as follows:

FIGS. 5 *a*) and 5 *b*) shows by way of example, pressure tapping line geometries of the present disclosure as well as correspondingly adapted walls of the wind protector;

DETAILED DESCRIPTION

Figure 1:
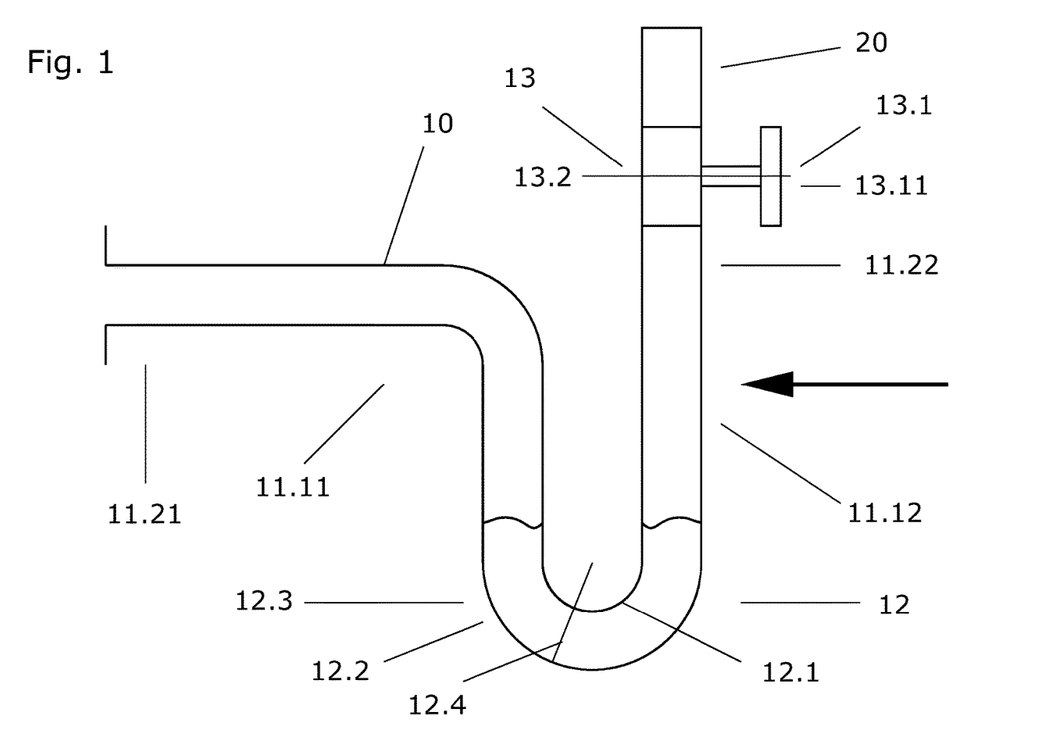
FIG. 1 shows by way of example, a pressure tapping line.

FIG. 1 shows by way of example a known pressure tapping line 10, which has at a second end 11.22 a valve 13, to which a pressure measuring device 20 is connected. The pressure tapping line includes a trap 12, which contains a condensed medium. The trap includes a trap bend 12.3 with an inner side 12.1 and an outer side 12.2, wherein the outer side has an outer radius 12.4. The valve includes an actuating element 13.1, for example, a turning handle 13.11, wherein the actuating element is arranged along a longitudinal axis 13.2. The valve is optional. A pressure measuring device can also be connected to a pressure tapping line lacking a valve. The pressure tapping line can be connected via a first end 11.21, for example, to a flow measuring device 120; see FIG. 7. Such a pressure tapping line, when located outside, can in the winter at freezing temperatures and wind (indicated by the arrow) run the danger that the condensed medium freezes.

Figure 2:
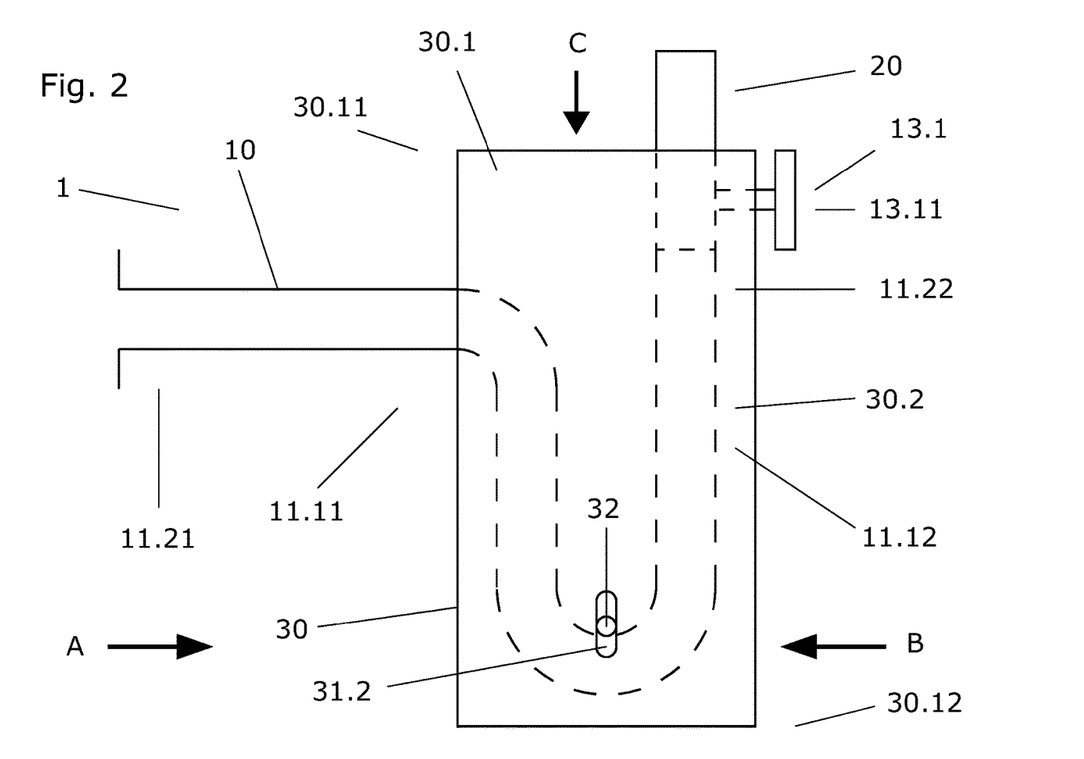
FIG. 2 shows an assembly of the invention with wind protector.

FIG. 2 shows an assembly 1 of the invention comprising a pressure tapping line 10, such as shown in FIG. 1, with, arranged thereon, a wind protector 30, which is adapted to protect the pressure tapping line in the region of the trap 12. The wind protector includes a tubular wall 30.1, which has, for example, a round, polygonal or oval cross section. The wall includes a first open end 30.11 and a second open end 30.12 and envelops an internal volume 30.2, wherein the first open end is arranged vertically above the second open end.

Due to the open ends, air can move through the wind protector, such that convection can bring about an air exchange between the internal volume and the surroundings. The trap is, however, at least partially protected from a direct flowing of wind onto it. The wind protector can, such as shown here, include a holder apparatus 32, by means of which the weight of the wind protector is supported on the inner side of the trap. The holder apparatus can include, for example, a strut, which connects two sides of the wall and is secured at openings 31.2 of the wall. The strut can comprise, for example, a screw with a nut. The openings 31.2 of the wall are advantageously embodied elongated, so that a positioning of the strut along the elongation is possible. The tubular wall is made, for example, from sheet material, wherein the sheet material comprises, for example, aluminum, steel or a plastic.

The slots enable pushing the wall of the wind protector from below over the trap until contact is made with the bearing points. A subsequent installing of the holder apparatus secures the wind protector against falling.

Figure 3:
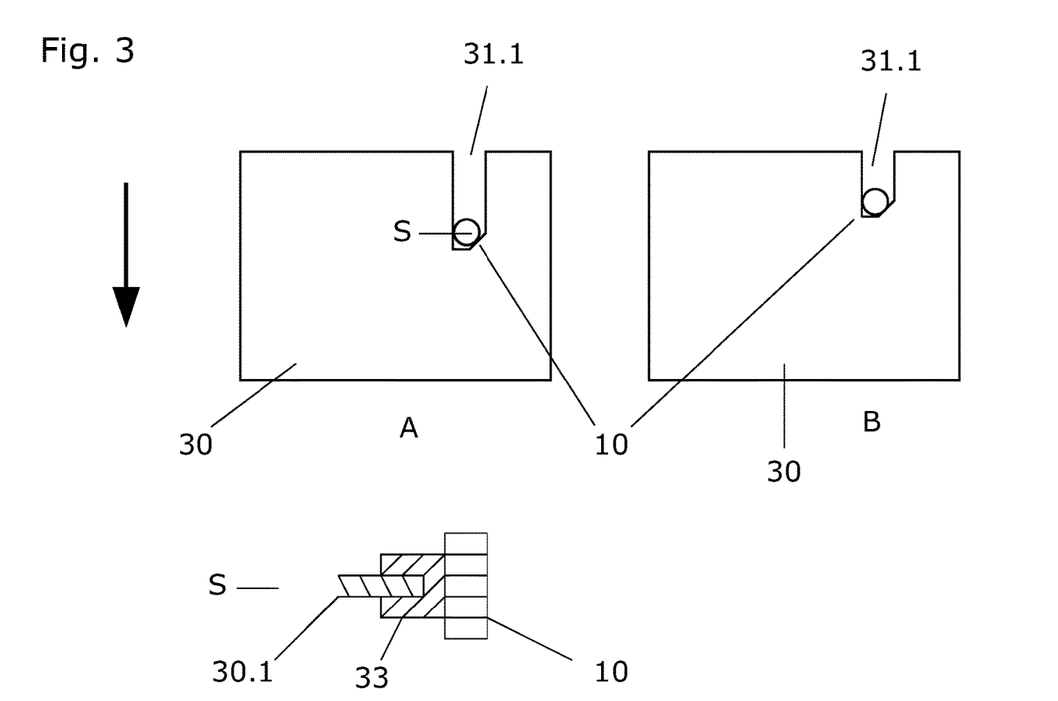
FIG. 3 shows slots of the invention in a wall of the wind protector as well as a seating of the pressure tapping line in the slot.

FIG. 3 shows schematically two side views of the wind protector 30 taken in the direction of the arrows A and B in FIG. 2. Shown in each case is a slot 31.1, through which the pressure tapping line 10 extends. The direction of the weight of the wind protector 30 is indicated, in such case, by the arrow. The slots can, such as shown here, have a chamfering, in order to enable a two-point seating of the pressure tapping line. In this way, the pressure tapping line can be better decoupled from the wind protector. The wall 30.1 can, such as shown in the sectional view S, have in the region of the seating a thermal insulation 33, which has a significantly lesser thermal conductivity than the pressure tapping line. The thermal insulation has, in such case, a thermal conductivity, which is less at least by a factor of 5 and, especially, at least by a factor of 25, and preferably at least by a factor of 100 than a thermal conductivity of the pressure tapping line. Other than shown here, alternatively or supplementally, the pressure tapping line can have a thermal insulation, for example, in the form of a cuff. Typical materials, which are suitable for manufacture of a pressure tapping line, are, for example, steels, nonferrous alloys and aluminum. Steels have a thermal conductivity from 12 to 60 W/(m*K). Suitable as thermal insulation are plastics, for example, especially high temperature resistant plastics, such as, for example, polyurethane, and even mineral wool. These thermally insulating materials usually have a thermal conductivity of under 0.1 W/(m*K).

Figure 4:
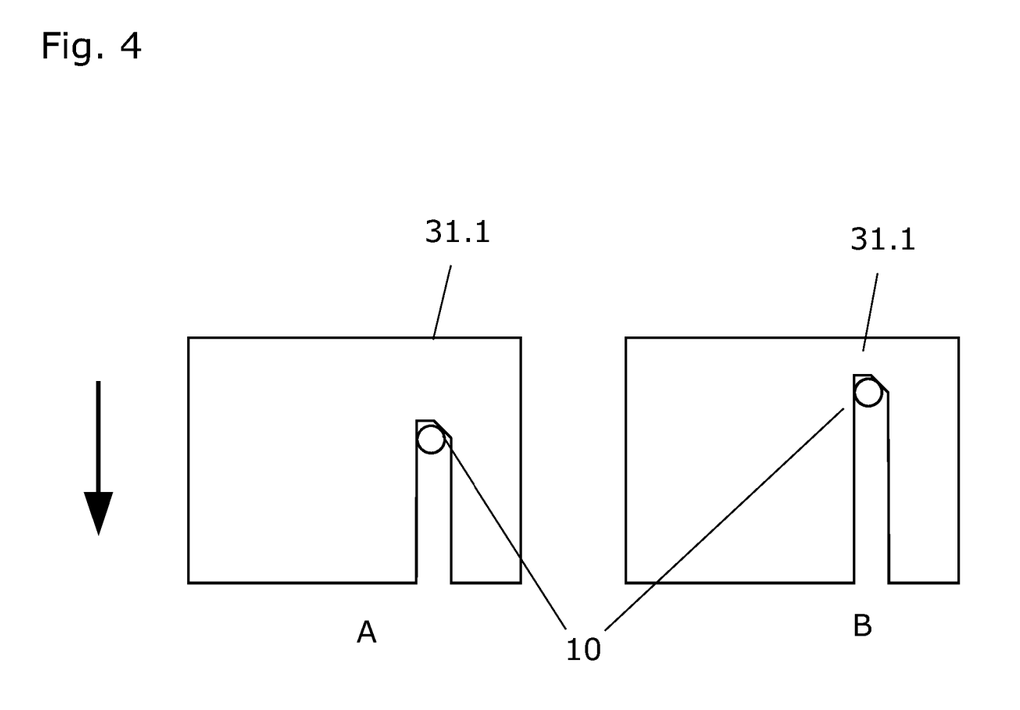
FIG. 4 shows slots of the invention in a wall of the wind protector as well as a seating of the pressure tapping line in the slot.

FIG. 4 shows an alternative embodiment of the slots shown in FIG. 3, wherein the slots open in the direction of the weight vector. The slots themselves, thus, provide a weight bearing surface, so that a holder apparatus of FIG. 3 is not required. Disadvantageous in this case is that the slots must be significantly longer, so that the wind protector offers less protection against wind.

The wind protector shown in FIGS. 3 and 4 is one piece. Alternatively, such a wind protector can also be composed of a plurality of parts, for example, parts which plug together. In such case, each opening accommodating the pressure tapping line can be formed by cutouts in two adjoining wind protector portions.

Figure 5:
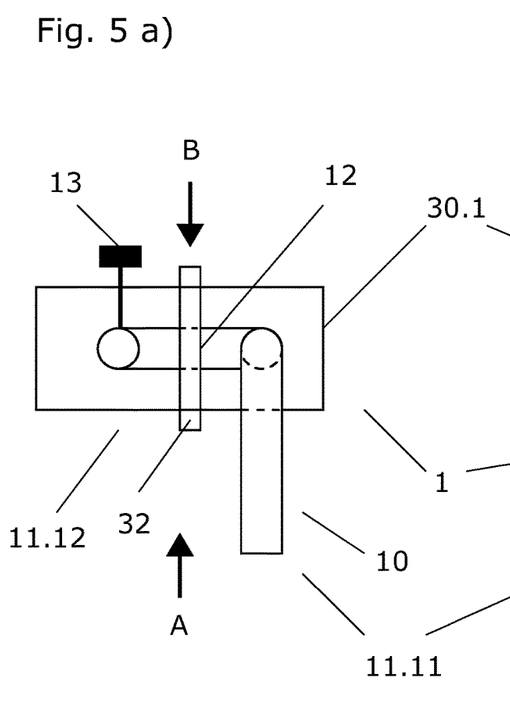

FIGS. 5a) and b) show embodiments of the invention viewed in the direction C of FIG. 2, wherein the trap in FIG. 5a) has in the second section 11.12 a right angle to the pressure tapping line in the first section 11.11. In the embodiment shown in FIG. 5b), the pressure tapping line extends along a plane. The orientation of the valve and its actuation are purely by way of example. Those skilled in the art can adapt the wind protector for a given pressure tapping line according to requirements.

Figure 6:
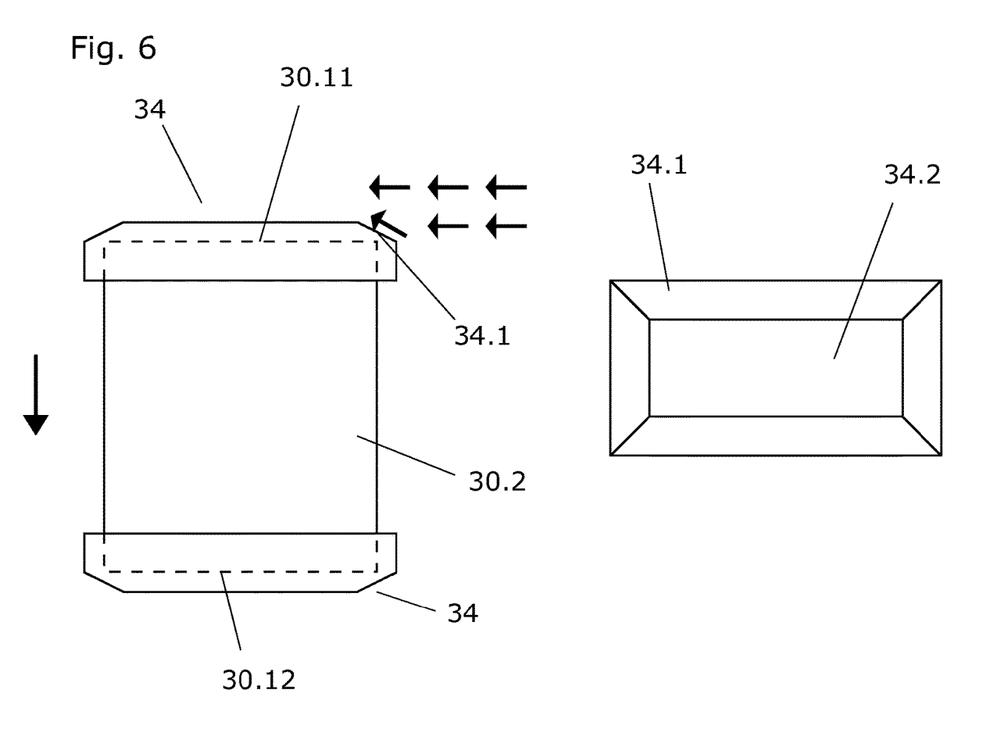
FIG. 6 shows a lid element and examples of arrangements of the lid element on the wall of the wind protector.

FIG. 6 shows a lid element 34 and possible arrangements on the wall 30.1 of the wind protector. The lid element has a smaller opening 34.2 than the first open end 30.11 and the second open end 30.12 of the wall. Additionally, the lid element can have an aerodynamically acting feature 34.1, which prevents wind from getting into the opening of the lid element 34.2. For example, the aerodynamically acting feature can be an inclined surface, which effectively deflects the wind away from the opening. A wind protector with lid element offers an improved wind protector while practically retaining convection of the air through the internal volume of the wind protector.

Alternatively to a lid element, the wall in the region of the first open end or of the second open end can, in each case, have at least one folding, or angling, wherein the folding/angling partially closes the first open end, or the second open end, as the case may be. The first, or second open end is, in such case, defined by the tubular region of the wall.

Figure 7:
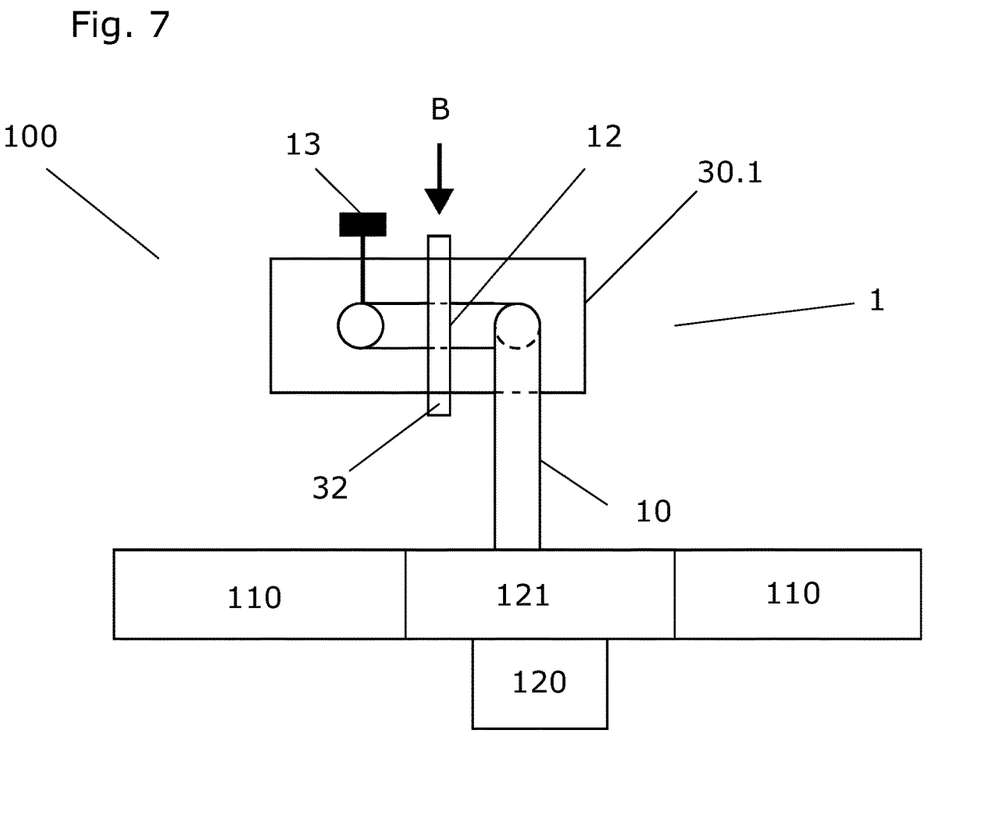
FIG. 7 shows by way of example, a flow measuring point of the present disclosure.

FIG. 7 shows schematically a flow measuring point 100 with an assembly 1 of the invention, a pipeline 110 and a flow measuring device 120, which is connected to the pipeline via a measuring tube 121. The assembly 1 is, in such case, connected via the pressure tapping line to the measuring tube of the flow measuring device.

The flow measuring device, is, for example, a vortex, flow measuring device, an ultrasonic, flow measuring device, a thermal, flow measuring device or a pressure difference, flow measuring device.

The invention claimed is:
1. An assembly, including:
a pressure tapping line having a first end and a second end,
a pressure measuring device for registering a pressure within the pressure tapping line,
wherein the pressure tapping line is connected using the first end to a vapor conveying pipe or tube, wherein the pressure measuring device is connected to the second end of the pressure tapping line,
wherein the pressure tapping line has a sectionally bent trap, which is configured to contain a condensate of the vapor,
wherein the assembly includes a wind protector that is supported by the pressure tapping line and having a tubular wall including a first open end and a second open end configured and positioned to surround the pressure tapping line at the trap such that convection through the tubular wall facilitates exchange of internal volume air and surrounding air;
wherein the tubular wall includes additional opposing open ends configured to move air through the wind protector;
wherein the wind protector is separable from the pressure tapping line.
2. The assembly of claim 1,
wherein an envelope of the wind protector encloses an internal volume, in which the trap is arranged,
wherein the first open end is arranged vertically above the second open end,
wherein a cross section of the tubular wall traces a circle, an oval, or a rectangle.
3. The assembly of claim 1,
wherein the internal volume of the wind protector equals a third power of an outer radius of a trap bend multiplied by a factor F,
wherein F is less than 1000.
4. The assembly of claim 2,
wherein the pressure tapping line includes a first section line toward the first end and a second section toward the second end,
wherein the wall of the wind protector has at least one slot, by which the wind protector is mounted on the pressure tapping line, wherein the pressure tapping line extends through the slot.
5. The assembly of claim 3,
wherein the trap bend includes an inner side and an outer side,
wherein the wind protector has a holder apparatus, which lies against the inner side of the trap.
6. The assembly of claim 2,
wherein the holder apparatus comprises a strut, which is mounted to the wall using two openings in the wall.
7. The assembly of claim 4,
wherein at least one slot has a bearing surface.
8. The assembly of claim 4,
wherein at least one seating of the wind protector on the pressure tapping line has thermal insulation,
wherein the thermal insulation has a thermal conductivity, which is less at least by a factor of 5 smaller than the thermal insulation of the pressure tapping line.
9. The assembly of claim 2,
wherein the wall is made of sheet material, wherein the sheet material comprises aluminum, steel or a plastic.
10. The assembly of claim 2,
wherein the wind protector comprises at least one lid element configured to at least partially to close the first open end or the second open end of the tubular wall.
11. The assembly of claim 10,
wherein the lid element includes an aerodynamically acting feature, which leads atmospherically related air movements past and not into an opening of the lid.

12. The assembly of claim 2,
wherein the trap is spaced from the wall.

13. The assembly of claim 1,
wherein the pressure tapping line includes on its second end a valve enables a connecting of the pressure measuring device,
wherein the valve has an actuating element with a longitudinal axis, extends with an angle of less than 60 degrees from a radius of the pressure tapping line.

14. A flow measuring point for measuring a volume flow or a flow velocity or a mass flow of a vaporous medium in a pipeline, comprising: a pipeline, a flow measuring device having a measuring tube, wherein the measuring tube is connected with the pipeline, and an assembly, including: a pressure tapping line having a first end and a second end, a pressure measuring device for registering a pressure within the pressure tapping line, wherein the pressure tapping line is adapted to be connected using the first end to a vapor conveying pipe or tube, wherein the pressure measuring device is adapted to be connected to the second end of the pressure tapping line, wherein the pressure tapping line has a sectionally bent trap, which is adapted to contain a condensate of the vapor, wherein the assembly includes a wind protector that is supported by the pressure tapping line and having a tubular wall including a first open end and a second open end configured and positioned to surround the pressure tapping line at the trap such that convection through the tubular wall facilitates exchange of internal volume air and surrounding air, wherein the tubular wall includes additional opposing open ends configured to move air through the wind protector, wherein the pressure tapping line is connected to the measuring tube of the flow measuring device; wherein the wind protector is separable from the pressure tapping line.

15. The flow measuring point of claim 14,
wherein the flow measuring device is a vortex flow measuring device, an ultrasonic flow measuring device, a thermal flow measuring device or a pressure difference flow measuring device.

* * * * *